United States Patent [19]

Gorog

[11] Patent Number: 4,463,850

[45] Date of Patent: Aug. 7, 1984

[54] VIDEO DISC CADDY

[75] Inventor: Istvan Gorog, Princeton, N.J.

[73] Assignee: RCA Corporation, New York, N.Y.

[21] Appl. No.: 493,193

[22] Filed: May 10, 1983

[51] Int. Cl.³ .......................... B65D 85/57; G11B 5/82
[52] U.S. Cl. ...................................... 206/309; 206/444; 360/133
[58] Field of Search ................ 206/307, 444, 309-313; 360/133

[56] References Cited

U.S. PATENT DOCUMENTS

| | | | |
|---|---|---|---|
| 1,498,577 | 6/1924 | Reinhold | 206/312 |
| 2,446,641 | 8/1948 | Daymon | 206/309 |
| 4,013,296 | 3/1977 | Keeney | 206/309 |
| 4,138,703 | 2/1979 | Stave et al. | 360/133 |
| 4,145,726 | 3/1979 | Conaty | 360/133 |
| 4,159,827 | 7/1979 | Torrington | 206/313 |
| 4,239,108 | 12/1980 | Coleman et al. | 360/133 |
| 4,266,784 | 5/1981 | Torrington | 360/133 |

FOREIGN PATENT DOCUMENTS 2078678A 1/1982 United Kingdom ................ 206/444

Primary Examiner—George E. Lowrance
Assistant Examiner—Jimmy G. Foster
Attorney, Agent, or Firm—Eugene M. Whitacre; William H. Meise; Dilip A. Kulkarni

[57] ABSTRACT

The video disc caddy comprises a relatively compliant, record retaining spine subject to removable reception in an outer sleeve. The outside lateral dimension of the spine is made larger than the corresponding dimension of the sleeve so that when the record/spine assembly is inserted into the sleeve, the spine gently squeezes the record to hold it in place upon insertion.

5 Claims, 7 Drawing Figures

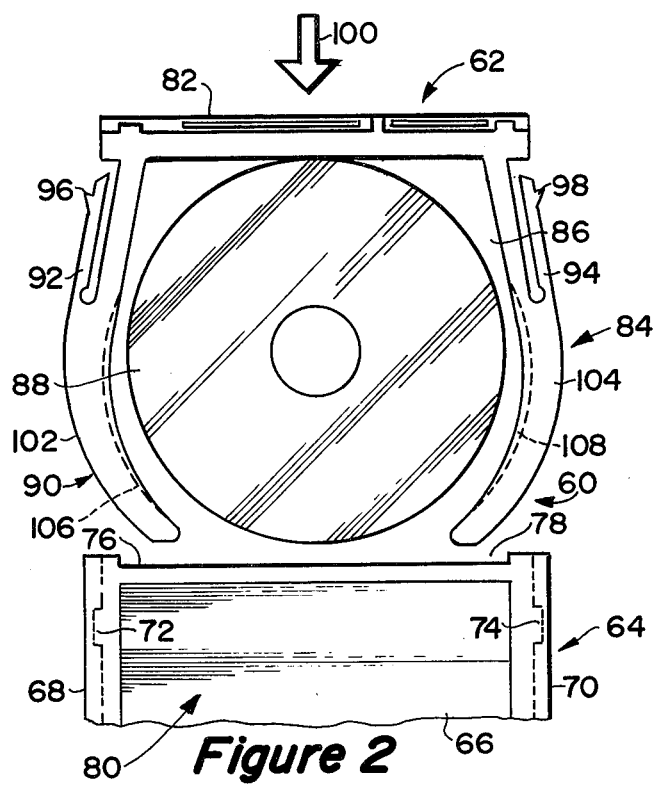
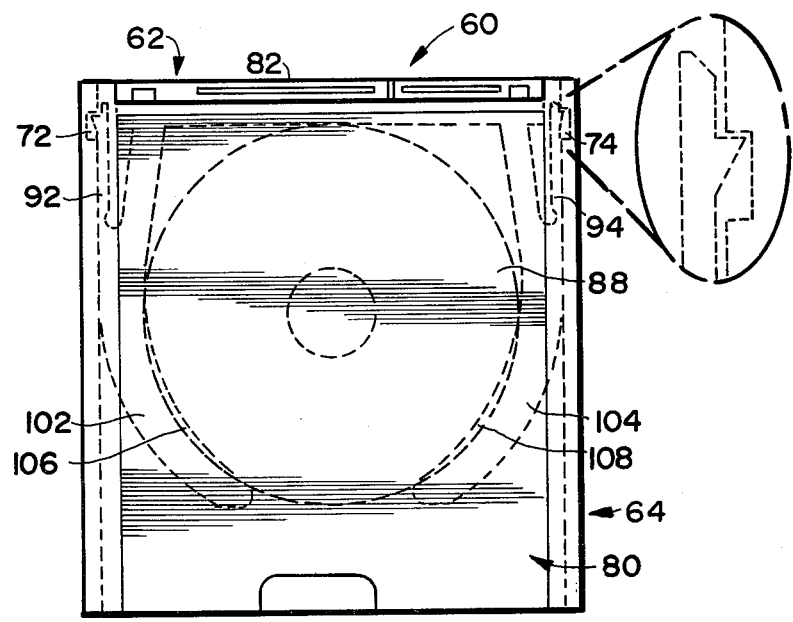

VIDEO DISC CADDY

This invention relates to a disc record package and, more particularly, it pertains to a record package suitable for loading a record into the player and removing it therefrom without the need for touching it.

In certain systems, picture and sound signals are stored on a disc record in the form of physical undulations in a continuous spiral track disposed on the record surface. The variations in electrical capacitance between an electrode disposed on a record-engaging stylus and a conductive property of a turntable-supported video record are sensed as the physical undulations on the record surface pass beneath the stylus tip. The capacitive variations are converted into electrical signals suitable for application to a conventional television receiver.

It is beneficial to enclose a video disc in a caddy which comprises a record retaining spine removably located within an outer sleeve. The sleeve has an edge opening in communication with a record enclosing cavity. The record retaining spine consists of a leading closure portion and a trailing annular portion having an opening in which a record is received. The opening in the annular portion of the spine is slightly larger than the record to allow it to pass freely therethrough. The record retaining spine is provided with a pair of spaced apart locking fingers disposed at the opposite edges thereof to releasably secure the spine to the sleeve. The caddy sleeve is covered with a wrap-around label containing program information and graphics. For record loading, a full caddy is inserted into an input slot provided in the player along a pair of caddy guide rails. A record extraction mechanism disposed in the player removes the record/spine assembly from the sleeve when the sleeve is withdrawn to leave the record/spine assembly inside the player resting on a set of record receiving pads. The retained record is then transferred by a record handling mechanism to a turntable for playback. For record retrieval, the record is transferred back to the receiving pads, and an empty jacket is reinserted into the player to recapture the record/spine assembly.

U.S. Pat. issued to Coleman et al. (No. 4,239,108) describes a video disc caddy construction. The caddy sleeve shown in the Coleman et al. patent comprises a pair of injection molded caddy havles which are welded together. The injection molded caddy halves are relatively expensive. To reduce cost, it is desirable to fabricate the sleeve from inexpensive materials, such as cardboard. A problem with the use of cardboard-type soft materials is that, during record loading and unloading, the record could get wedged between the spine and the sleeve causing a jam.

In accordance with this invention, the relatively compliant annular portion of the spine has an outside lateral dimension that exceeds the corresponding inside dimension of the record enclosing cavity so that when the record/spine assembly is inserted into the sleeve, the annular portion of the spine grips the record to hold it in place.

According to another feature of the invention, the annular portion of the spine is equipped with a peripheral gap to provide the desired lateral compliance.

Pursuant to a still further aspect of the invention, the inside wall of the annular portion defining the record receiving opening is equipped with a circumferential groove to secure the record as the record/spine assembly is inserted into the sleeve.

In the drawings:

FIGS. 2 and 3 illustrate a first embodiment of the video disc caddy in accordance with the present invention;

Figure 4:
Figure 5:
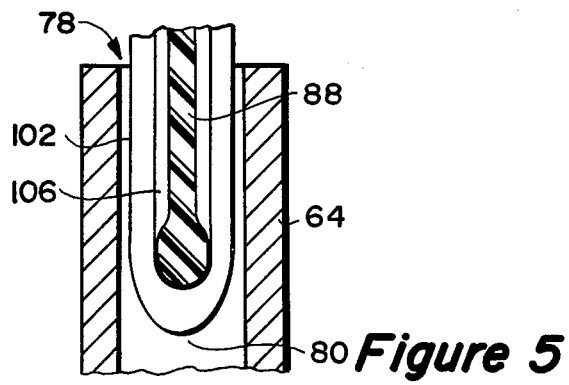
Figure 6:
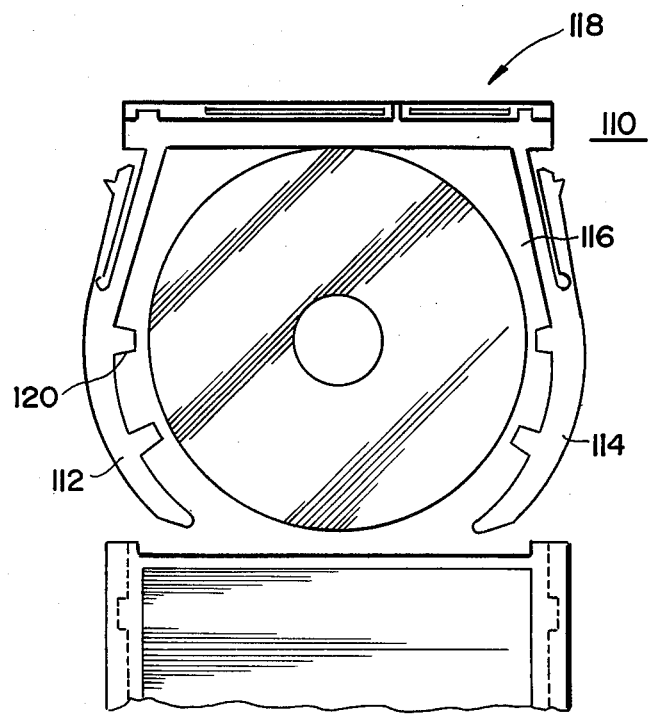
Figure 7:
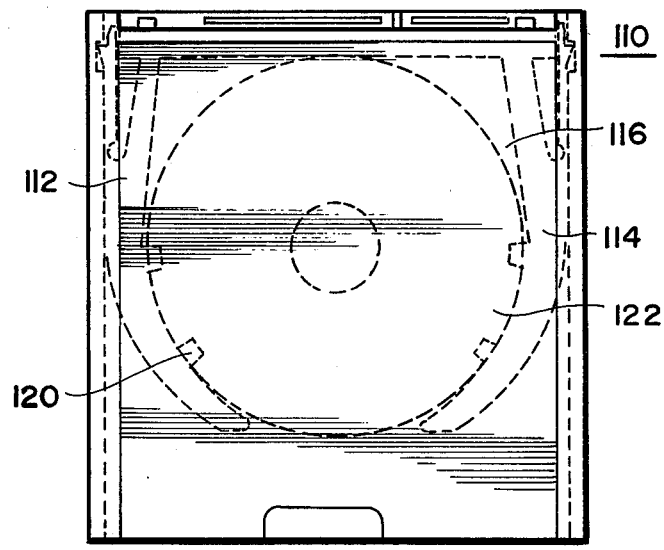

FIGS. 4 and 5 depict certain details of the video disc caddy of FIGS. 2 and 3; and FIGS. 6 and 7 portray another embodient of the subject invention.

Figure 1:
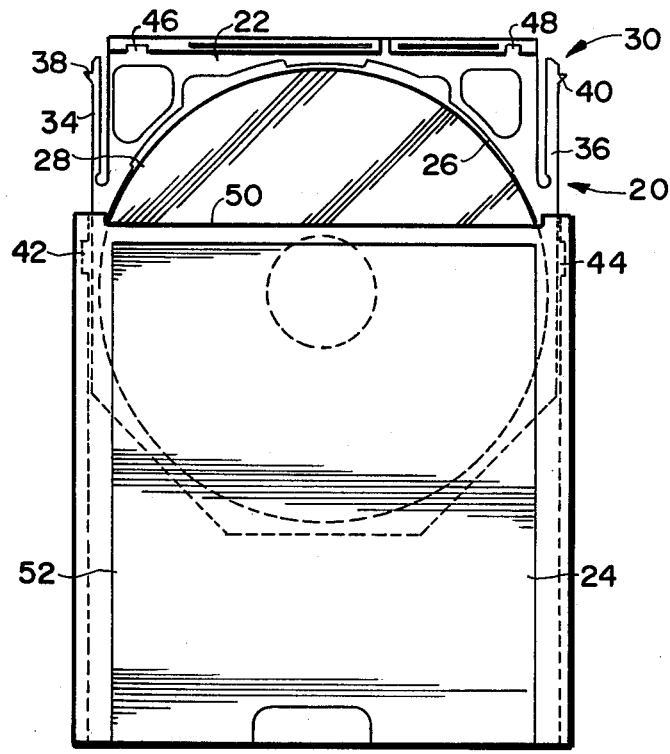
FIG. 1 shows a video disc caddy of the prior art design.

The prior art video disc caddy 20, depicted in FIG. 1, consists of a planar injection-molded record retaining spine 22 removably enclosed in a flat outer sleeve 24. The retaining spine 22 has an opening 26 in which a centrally-apertured record 28 is received forming a record/spine assembly 30. Integrally molded with the spine 22 are spine locking fingers 34 and 36 for releasably securing the spine 22 in its sleeve 24. The spine locking fingers 34 and 36 are fitted with protruding elements 38 and 40 which are received in the respective recesses 42 and 44 provided in the sleeve 24 to hold the spine 22 in place. The spine 22 has cutouts 46 and 48 in which the respective spine latching members of a record extraction mechanism are received to secure the spine to the player, so that the record/spine assembly 30 is retained inside the player when the caddy sleeve 24 is withdrawn. The caddy sleeve 24 has a record access opening 50 in communication with a record enclosing cavity 52. The caddy sleeve 24 is formed by ultrasonically welding two injection-molded caddy halves. U.S. Pat. No. 4,239,108 issued to Coleman et al. explains the particulars of a rigid, injection-molded caddy.

To reduce cost, it is desirable to use a cardboard-type sleeve, instead of a rigid, injection-molded sleeve. As previously noted, a problem with a pliable, cardboard-type sleeve is that the record might get trapped between the spine and the sleeve during record loading and unloading. The present invention overcomes these problems.

FIGS. 2 and 3 illustrate a caddy 60 in accordance with the present invention. The caddy 60 comprises an inner spine 62 adapted for reception in an outer sleeve 64. The outer sleeve 64 consists of a U-shaped cardboard enclosure 66 secured to a pair of T-shaped, plastic side rails 68 and 70. Any suitable technique may be used for mounting the side rails 68 and 70 to the enclosure 66, such as gluing. The side rails 68 and 70 may be in the form of plastic extrusions (polystyrene). A pair of pockets 72 and 74 are provided in the side rails for capturing the spine locking fingers. The front portion of the sleeve 64 has a cutout 76 in which the leading edge of the spine 62 is seated upon assembly. The sleeve 64 defines an edge opening 78 in communication with a record enclosing cavity 80 in which the record/spine assembly is received.

The spine 62 comprises a leading closure portion 82 and a horseshoe-shaped annular portion 84. The closure portion 82 is shaped and dimensioned for reception in the cutout 78 of the sleeve. The trailing annular portion 84 has an opening 86 in which a record 88 is loosely received to form a record/spine assembly 90. The diameter of the record receiving opening 86 is normally greater than the diameter of the record 88 to allow it to pass freely therethrough, for example, for transfer of the record between the record receiving pads and the turntable in the player. Disposed on the spine 62 are a pair of spine locking fingers 92 and 94. The spine locking fingers 92 and 94 are respectively fitted with individual protruding elements 96 and 98, which are captured in the corresponding pockets 72 and 74 in the sleeve 64 when the record/spine assembly 90 is inserted therein to prevent accidental removal of the record/spine assembly.

The lateral outside dimension of the spine 62 (i.e., the dimension of the spine perpendicular to the insertion direction 100 and in the plane of FIGS. 2 and 3) is made larger than the corresponding inside dimension of the record enclosing cavity 80 so that when the record/spine assembly 90 is inserted into the sleeve 64, the jaws 102 and 104 of the horseshoe-shaped annular portion 84 of the spine close to capture the record 88 as can be seen from FIG. 3.

The jaws 102 and 104 of the spine 62 are provided with respective circumferential grooves 106 and 108 along the interior walls thereof to properly center and secure the record 88 upon its reception in the record enclosing cavity 80 as indicated in FIGS. 4 and 5.

A video disc caddy 110 according to another version of the present invention is illustrated in FIGS. 6 and 7, which correspond to FIGS. 2 and 3 respectively. The main difference between the two embodiments is that in the embodiment of FIGS. 6 and 7, the jaws 112 and 114 defining the record receiving opening 116 in the spine 118 are provided with a plurality of record retaining clamps 120 to capture the record 122 as shown in FIG. 7.

What is claimed is:

1. A disc record package comprising an outer sleeve having an edge opening in communication with a record enclosing cavity, and an inner record retaining spine having a closure portion and a relatively compliant annular portion; said spine being subject to insertion into said record enclosing cavity through said edge opening; said annular portion defining an opening in which a record is received to form a record/spine assembly; said opening in said annular portion being normally larger than said record to allow it to pass freely therethrough; said package including means for releasably securing said spine to said sleeve; wherein the improvement comprises making the difference between the outside dimension of said annular portion and the inside dimension of said record enclosing cavity greater than the corresponding difference between the inner walls of said annular portion defining said opening therein and the outer periphery of said record to produce an interference between said spine and said record as said record/spine assembly is inserted into said sleeve, so that said record is held in place during insertion.

2. The disc record package as defined in claim 1 wherein said annular portion of said record retaining spine is provided with a peripheral gap to allow said annular portion to close in order to capture said enclosed record upon insertion of said record/spine assembly into sleeve.

3. The disc record package as set forth in claim 1 wherein the lateral outside dimension of said annular portion is larger than the corresponding inside dimension of said record enclosing cavity to produce a lateral interference between said record and said annular portion when said record/spine assembly is enclosed in said sleeve.

4. The disc record package as outlined in claim 1 wherein the inside wall of said annular portion defining said opening therein is equipped with a circumferential groove to capture said enclosed record when said record/spine assembly is received in said sleeve.

5. The disc record package of claim 1 wherein said sleeve consists of a pliable, U-shaped enclosure mounted to a pair of relatively rigid, T-shaped side rails.

* * * * *

UNITED STATES PATENT AND TRADEMARK OFFICE
CERTIFICATE OF CORRECTION

PATENT NO. : 4,463,850
DATED : August 7, 1984
INVENTOR(S) : ISTVAN GOROG

It is certified that error appears in the above—identified patent and that said Letters Patent is hereby corrected as shown below:

Col. 1, Line 48 - "molded caddy havles" should be -- molded caddy halves --;

Col. 2, Line 61 - "the cutout 78 of the" should be -- the cutout 76 of the --

Signed and Sealed this

Eighteenth Day of December 1984

[SEAL]

Attest:

GERALD J. MOSSINGHOFF

Attesting Officer        Commissioner of Patents and Trademarks